United States Patent

[11] 3,630,166

| [72] | Inventors | Franklin D. Riddle;<br>Robert Kenneth Crossland, both of Greenville, S.C. |
|---|---|---|
| [21] | Appl. No. | 23,941 |
| [22] | Filed | Mar. 30, 1970 |
| [45] | Patented | Dec. 28, 1971 |
| [73] | Assignee | Southern Machinery Company<br>Greer, S.C. |

[54] WATERPROOF CLICKER UNIT FOR FISHING REEL
10 Claims, 6 Drawing Figs.

[52] U.S. Cl. ................................................. 116/67, 242/84.51
[51] Int. Cl. ................................................. G08b 3/00
[50] Field of Search ................................... 116/67, 73, 74; 43/17, 20, 22; 242/84.51

[56] References Cited
UNITED STATES PATENTS

| 330,811 | 11/1885 | Vom Hofe | 242/84.51 |
| 2,049,666 | 8/1936 | Schafer | 242/84.51 |
| 2,116,581 | 5/1938 | Moor | 242/84.51 |
| 2,489,457 | 11/1949 | Maerk | 242/84.51 UX |
| 3,510,083 | 5/1970 | Cook | 242/84.51 |

Primary Examiner—Louis J. Capozi
Attorney—B. P. Fishbure, Jr.

ABSTRACT: A clicker unit includes a small body having a pressed fit in an opening provided in one end plate of a fishing reel. A spring-urged plunger assembly is contained movably in said body including a clicker element adapted to engage spaced recesses in a rotating plate carried by the reel spool. A sealed rotary means is provided on the body of the clicker unit to move the clicker plunger assembly between "on" and "off" positions.

PATENTED DEC 28 1971 3,630,166

INVENTOR
FRANKLIN DELANO RIDDLE
ROBERT K. CROSSLAND
BY
B.P. Fishburn Jr.
ATTORNEY

WATERPROOF CLICKER UNIT FOR FISHING REEL

Clickers for fishing reels are know in the prior art and these devices are simply a means of indicating to the fisherman audibly that a fish has swallowed the bait and is pulling out the line from the reel. In the prior art fishing reel clicker structures, a problem has been that the clicker is exposed to water and usually becomes rusted or corroded after a period of time and may become inoperable. Additionally, some of the known clickers are delicate in construction and the parts have a tendency to fail and in general the known structures are not too reliable over a long period and require fairly expensive maintenance service including replacement of corroded parts.

In light of the above, it is the objective of the invention to provide a greatly improved clicker unit for fishing reels which is rugged and durable and essentially waterproof so that the parts are protected substantially against corrosion and binding. The clicker is embodied in a virtually self-contained unit which can be readily mounted on a variety of reels by simply drilling a hole in one reel end plate so that the clicker unit can be tightly pressed into place on such end plate with the noise-producing element in proper alignment with the annular row of dimples or recesses of the opposing rotary plate. A reliable and sturdy means is provided on the unit to quickly adjust the clicker to active and inactive positions relative to the reel spool and the dimpled plate carried thereby.

Other features and advantages of the invention will be apparent during the course of the following detailed description.

BRIEF DESCRIPTION OF DRAWING FIGURES

DETAILED DESCRIPTION OF PREFERRED EMBODIMENT

Figure 1:
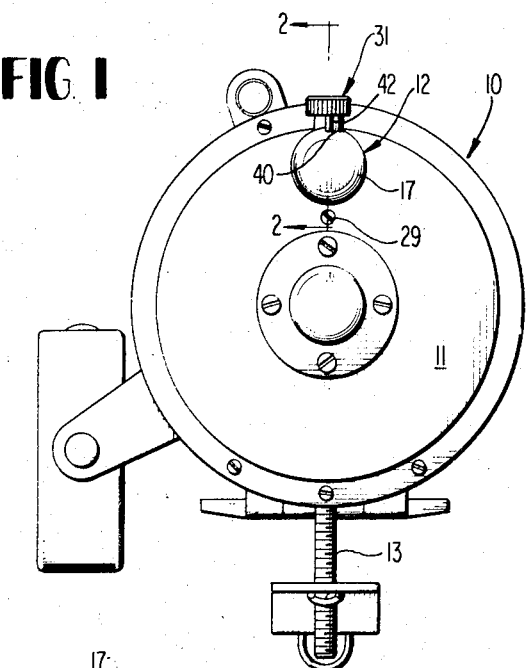
FIG. 1 is a side elevation of a fishing reel equipped with the clicker unit or attachment embodying the invention.

Referring to the drawings, wherein like numerals designate like parts, the numeral 10 designates a typical fishing reel in its entirety having a relatively stationary end plate 11 upon which the clicker unit 12 embodying the present invention is securely mounted. The reel 10 has the usual clamping means 13 for attachment to a fishing pole and also has a rotary plate 14 as a part of the reel spool, this rotary plate being in spaced opposed relation to the end plate 11 and turning in relation thereto on the axis of the reel. The rotary plate 14 has an annular row of relatively shallow dimples or recesses 15 provided therein to coact with a clicker element or pin 16 to produce the desired clicking sound to alert the fisherman that the fish has swallowed the bait and is running with the line. Other details of the fishing reel 10 are unimportant to a proper understanding of this invention, which resides in the structure of the clicker unit 12. It should be mentioned that the clicker unit may be applied as an attachment to a variety of reels with very little structural modifications of the reel, in many cases requiring merely the drilling of one hole in the end plate of the reel for the mounting of the clicker body and a second hole for the mounting of a leaf spring, as will be described.

The clicker unit 12 comprises a body or housing 17 which may be basically cylindrical and having a reduced diameter leading extension 18 which has a pressed fit within an opening 19 formed in the reel end plate 11. The body 17 has a shoulder 20 thereon which abuts the outer face of the end plate 11. In this manner, the body or housing of the clicker unit is firmly assembled to the reel end plate and the pressed fit between the parts is watertight so that water cannot enter the interior of the reel through the opening 19. The clicker body 17 forms only a relatively small projection outwardly of one side of the reel as shown and is unobjectionable and in no way interferes with the normal use of the reel.

The body 17 is provided with a first bore 21 parallel to the reel axis and coaxial with each of the recesses 15 when the same is aligned with the clicker unit. This bore 21 slidably receives a plunger 22 therein, said plunger having a rear end recess 23 receiving a compressible coil spring 24, with the forward end of the spring bearing against the rear end of the clicker element or pin 16 to urge the same at all times toward the plate 14. The pin 16, as shown, has a rounded leading end 25 for smooth engagement with the series of recesses 15 in the rotary plate 14. It also has an enlarged collar 26 slidable within the recess or bore 23 and against which collar the spring 24 bears. The clicker pin 16 extends slidably through a reduced bore portion 27 of plunger 22, so that the entire plunger 22 including the pin 16 can reciprocate relative to the body 17 and plate 14 and there can also be relative reciprocation between the pin 16 and plunger 22.

Figure 6:
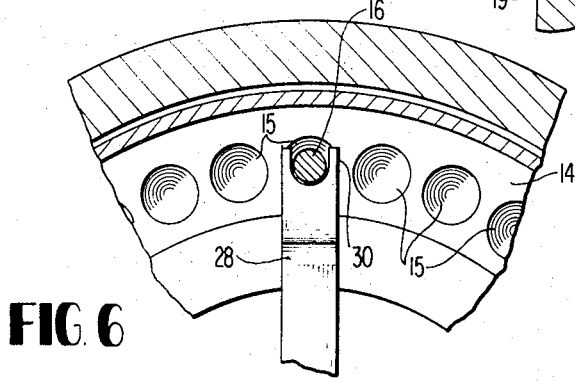
FIG. 6 is an enlarged fragmentary vertical section taken on line 6—6 of FIG. 3.

The entire plunger 22 is urged outwardly or away from the recessed plate 14 by a leaf spring 28 anchored to the inner face of reel end plate 11 by suitable fastener means 29. The upper end of this leaf spring is bifurcated as at 30, FIG. 6, to receive therethrough the clicker pin 16 while the leaf spring continuously bears against the leading end of the plunger 22 as shown clearly in FIGS. 2 and 3.

Working in opposition to the leaf spring 28 is a rotary device 31 for quickly rendering the clicker unit active or inactive at the will of the fisherman. This "on" and "off" unit or device 31 embodies a shaft 32 rotatably mounted in a second bore 33 of the body 17 at right angles to the first bore 21 and intersecting the latter. The bottom of the second bore 33 is closed as indicated at 34 to exclude water. The upper portion of the shaft 32 is sealed against the admission of water by an O-ring seal 35 seated in a groove 36 of the shaft 32 and received within a recess 37 machined in the top of the body 17.

Within the portion of the bore 33 which intersects the perpendicular bore 21, the shaft 32 has a reduced diameter eccentric portion 38 rigid therewith and this eccentric portion engages the inner end of the plunger 22 at all times due to the tension of the leaf spring 28. The eccentric portion 38 also serves to retain the coil spring 24 within its bore 23. The device 31 includes a turning knob 39 externally of the body 17 and near the top of the reel, FIG. 1. This knob is turned to rotate the eccentric 38 so that the latter will shift the plunger 22 back and forth between the retracted clicker inactive position of FIG. 2 and the extended clicker active position of FIG. 3, the spring 28 yielding as shown in FIG. 3, but always serving to return the plunger 22 to the position in FIG. 2 when the eccentric 38 allows such movement.

Figure 2:
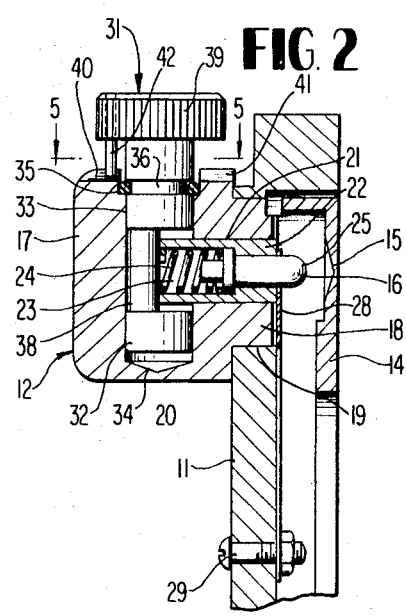
FIG. 2 is an enlarged fragmentary vertical section taken on line 2—2 of FIG. 1 and showing the clicker unit in the "off" or inactive position.
Figure 5:
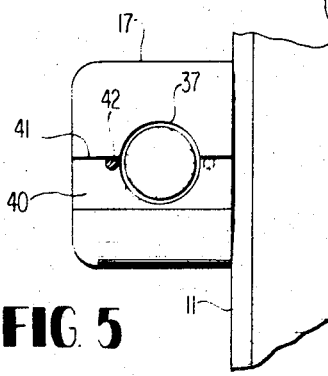
FIG. 5 is an enlarged fragmentary horizontal section taken on line 5—5 of FIG. 2.
Figure 4:
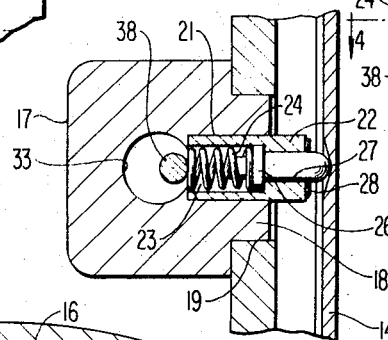
FIG. 4 is a horizontal section taken on line 4—4 of FIG. 3.

In order to accurately establish the "on" and "off" or active and inactive limits of the plunger 22, a groove or recess 40 is machined on the exterior surface of the cylindrical body 17 forming a shoulder edge 41 parallel to the axis of the plunger 22. A rigid stop pin 42 carried by the knob 39 is adapted to engage the edge or shoulder 41 at two points spaced 180° apart, FIG. 5, when the knob is turned to positively establish and limit the "on" and "off" position of the clicker, as shown in FIGS. 2 and 3.

Figure 3:
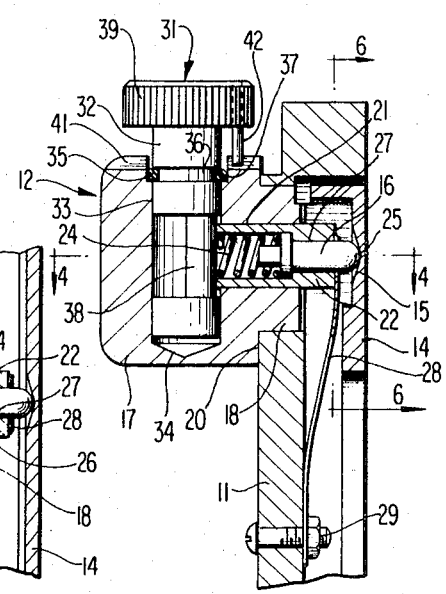
FIG. 3 is a sectional view similar to FIG. 2 showing the clicker in the "on" or active position.

When the plunger 22 is forced into the active position, FIG. 3, the clicker pin 16 will slide on the adjacent face of the rotary plate 14 and will enter the recesses 15 in rapid succession during rotation of the reel to produce the clicking noise whenever this is desired. A mere turning of the knob 180° will eliminate the activity of the clicker altogether.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A clicker unit for a fishing reel having a relatively stationary member and an opposing rotary member having a series of clicker recesses therein, said unit comprising a body mountable upon the relatively stationary member, said unit having a first bore, a plunger within the first bore and adapted to reciprocate therein, a clicker pin mounted for reciprocation on the plunger and aligned with the clicker recesses, a first spring on the plunger engaging the clicker pin and constantly urging the clicker pin toward engagement with the clicker recesses, a second spring connected with the plunger and constantly urging the plunger and the clicker pin away from the rotary member having the clicker recesses, said body having a second bore intersecting the first bore, and an eccentric device rotatable in the second bore and engaging the plunger and operable to shift the plunger toward and away from clicker active and inactive positions in opposition to the second spring.

2. The structure as defined in claim 1, and said relatively stationary member having an opening, said body having a portion press fitted into said opening to form a watertight connection between the body and member, and a seal between the body and eccentric device to exclude water from the second bore and thereby rendering the clicker unit substantially waterproof.

3. The structure as defined in claim 1, and said eccentric device embodying a rotatable shaft having an eccentric portion within the second bore and having an external turning knob, the eccentric device carrying a limit stop element, and a straight shoulder on the exterior of said body engageable with said stop element at two points spaced substantially 180° apart.

4. The structure as defined in claim 1, and said plunger having a cavity, said first spring being a coil spring within said cavity and having one end bearing on the back of the clicker spring and its other end bearing on the eccentric device, the plunger also having one end bearing on the eccentric device and its opposite end engaging the second spring.

5. The structure as defined in claim 4, and said second spring being a leaf spring secured to the interior face of the relatively stationary member and disposed between such member and the rotary member.

6. The structure as defined by claim 5, and said leaf spring having its free end bifurcated to straddle the clicker pin.

7. The structure as defined by claim 6, and said clicker pin having a rounded leading end.

8. The structure as defined by claim 3, and said limit stop element comprising a pin secured to said knob and extending parallel to said shaft near one side thereof.

9. The structure as defined by claim 3, and said straight shoulder comprising a radial edge on said body produced by machining a flat face on the periphery of said body.

10. The structure as defined by claim 1, and said second bore intersecting with the first bore of the body near the midpoint of the second bore, said bores being substantially perpendicular.

* * * * *